United States Patent [19]

Hopkins et al.

[11] Patent Number: 4,574,886
[45] Date of Patent: Mar. 11, 1986

[54] STEAM DRIVE OIL RECOVERY METHOD UTILIZING A DOWNHOLE STEAM GENERATOR AND ANTI CLAY-SWELLING AGENT

[75] Inventors: Daniel N. Hopkins, Dallas; Earl S. Snavely, Arlington, both of Tex.

[73] Assignee: Mobil Oil Corporation, New York, N.Y.

[21] Appl. No.: 663,260

[22] Filed: Oct. 22, 1984

Related U.S. Application Data

[62] Division of Ser. No. 573,094, Jan. 23, 1984, Pat. No. 4,522,263.

[51] Int. Cl.⁴ .............................................. E21B 43/24
[52] U.S. Cl. ...................................... 166/272; 166/59; 166/303; 166/305.1
[58] Field of Search ................ 166/260, 261, 272–275, 166/303, 305 R, 59; 405/263

[56] References Cited

U.S. PATENT DOCUMENTS

| | | | |
|---|---|---|---|
| 3,193,009 | 7/1965 | Wallace et al. | 166/272 |
| 3,198,249 | 8/1965 | Willman | 166/251 |
| 3,237,692 | 3/1966 | Wallace et al. | 166/272 X |
| 3,353,593 | 11/1967 | Boberg | 166/272 X |
| 3,476,183 | 11/1969 | Haynes et al. | 166/272 |
| 3,482,630 | 12/1969 | Earlougher, Jr. | 166/261 X |
| 3,490,241 | 1/1970 | Kuhn | 405/263 |
| 3,621,913 | 11/1971 | Braden, Jr. | 166/272 |
| 3,710,863 | 1/1973 | Webster et al. | 166/272 |
| 4,471,839 | 9/1984 | Snavely et al. | 166/260 |
| 4,478,280 | 10/1984 | Hopkins et al. | 166/260 |

Primary Examiner—George A. Suchfield
Attorney, Agent, or Firm—Alexander J. McKillop; Michael G. Gilman; Malcolm D. Keen

[57] ABSTRACT

Viscous oil is recovered from a subterranean, viscous oil-containing formation by a steam flooding technique wherein steam is generated in a downhole steam generator located in an injection well by spontaneous combustion of a pressurized mixture of a water-soluble fuel such as sugars and alcohols dissolved in water or a stable hydrocarbon fuel-in-water emulsion containing an anti clay-swelling agent and substantially pure oxygen. The generated mixture of steam and combustion gases pass through the formation, displacing oil and reducing the oil's viscosity and the mobilized oil is produced from the formation via a spaced-apart production well. Suitable anti clay-swelling agents include metal halide salts and diammonium phosphate.

25 Claims, 1 Drawing Figure

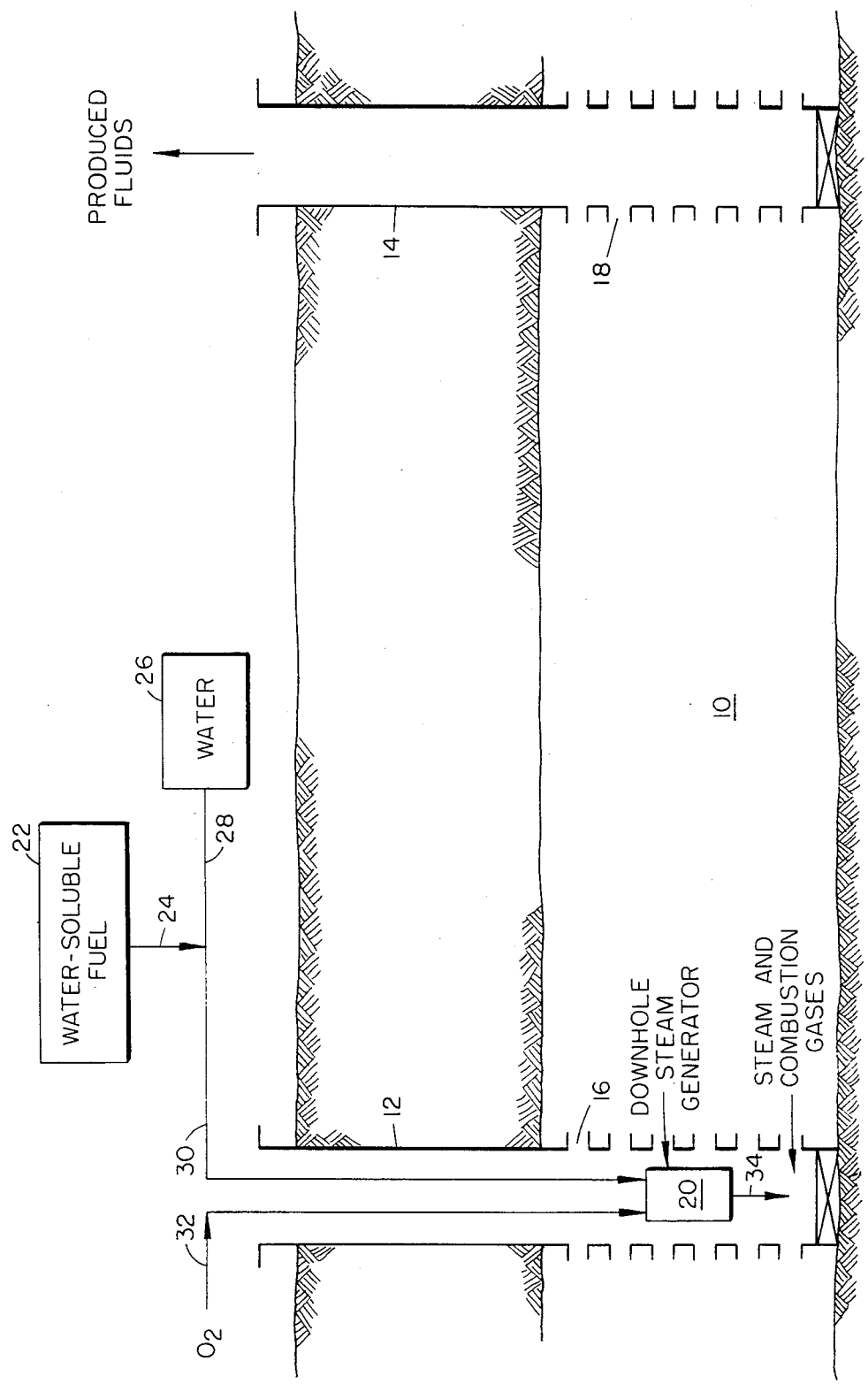

STEAM DRIVE OIL RECOVERY METHOD UTILIZING A DOWNHOLE STEAM GENERATOR AND ANTI CLAY-SWELLING AGENT

This is a divisional of copending application Ser. No. 573,094, filed on Jan. 23, 1984, now U.S. Pat. No. 4,522,263.

FIELD OF THE INVENTION

The present invention concerns a steam drive oil recovery method wherein the steam is produced in a downhole steam generator by spontaneous combustion of a pressurized mixture of a water-soluble fuel dissolved in water or a hydrocarbon fuel-in-water emulsion containing an anti clay-swelling agent with substantially pure oxygen.

BACKGROUND OF THE INVENTION

Steam has been used in many different methods for the recovery of oil from subterranean, viscous oil-containing formations. The two most basic processes using steam for the recovery of oil includes a "steam drive" process and "huff and puff" steam processes. Steam drive involves injecting steam through an injection well into a formation. Upon entering the formation, the heat transferred to the formation by the steam lowers the viscosity of the formation oil, thereby improving its mobility. In addition, the continued injection of the steam provides the drive to displace the oil toward a production well from which it is produced. Huff and puff involves injecting steam into a formation through a well, stopping the injection of steam, permitting the formation to soak and then back producing oil through the original well.

Steam flooding operations for recovering heavy oil utilizing propane- or diesel-fired downhole steam generators are described in the articles "Steam Generators Work Long Periods Downhole", OIL AND GAS JOURNAL, July 5, 1982, pp. 76 and 78, and "West Coast EOR Project Results Discouraging", OIL AND GAS JOURNAL, Aug. 9, 1982, page 82.

Applicants' copending application filed June 28, 1983, Ser. No. 508,705, now U.S. Pat. No. 4,478,280 relates to a viscous oil-containing formation by a steam flooding technique wherein steam is generated in a downhole steam generator located in an injection well by spontaneous combustion of a pressurized mixture of a water-soluble fuel such as sugars and alcohols dissolved in water or a stable hydrocarbon fuel-in-water emulsion and substantially pure oxygen.

In addition, many producing formations being steam flooded contain a certain amount of swelling clays in the form of a bentonite or montmorillonite clay, which upon swelling, reduces the permeability of the formation. Various methods are known for avoiding clay swelling such as use of low-grade steam containing dissolved salts described in U.S. Pat. No. 3,237,692 and treating wet steam with sodium chloride, guanidine hydrochloride, or other surface active agents as disclosed in U.S. Pat. No. 3,476,183.

The present invention provides an improved steam flood recovery process wherein steam is generated in a downhole generator located in the injection well adjacent the oil-containing formation by spontaneous combustion of a pressurized mixture of a water-soluble fuel dissolved in water or a hydrocarbon fuel-in-water emulsion containing an anti clay-swelling agent with substantially pure oxygen.

SUMMARY OF THE INVENTION

The process of our invention involves a method of recovering viscous oil from a subterranean, permeable, viscous oil-containing formation, said formation being penetrated by at least one injection well and at least one spaced-apart production well, said wells in fluid communication with a substantial portion of the formation comprising mixing a water-soluble fuel with water containing an anti clay-swelling agent, injecting said mixture under pressure into a steam generation zone located in the injection well, injecting substantially pure oxygen under pressure into said steam generation zone via said injection well which contacts the pressurized mixture of water-soluble fuel and water thereby effecting spontaneous combustion of said fuel to generate a mixture of steam and combustion gases that pass through the formation, displacing oil and reducing the oil's viscosity, and recovering fluids including oil from the formation via the production well until the fluid being recovered contains an unfavorable ratio of oil to water. Preferred water-soluble fuels include sugar such as molasses and raw sugars beet extract (juice) and alcohols such as methanol, ethanol, propanol, and isopropanol. Optionally, a hydrocarbon fuel-in-water emulsion containing an anti clay-swelling agent may be injected into the downhole stream generator for combustion with the pure oxygen. Suitable anti clay-swelling agents include metal halide salts such as sodium chloride, potassium chloride, magnesium chloride, aluminum chloride, calcium chloride, and ferric chloride, and diammonium phosphate and mixtures thereof.

BRIEF DESCRIPTION OF THE DRAWING

The drawing illustrates a vertical plane view of a subterranean formation penetrated by an injection well, and a downhole steam generator in the injection well adjacent the formation that subjects the formation to a steam flooding technique.

DESCRIPTION OF THE PREFERRED EMBODIMENT

Briefly, the oil recovery process of our invention involves a steam flooding method for recovering viscous oil in which steam is generated in a downhole steam generator positioned in the injection well by spontaneous combustion therein of a pressurized mixture of a water-soluble fuel dissolved in water or a hydrocarbon fuel-in-water emulsion containing an anti clay-swelling agent and substantially pure oxygen.

The process is better understood by referring to the drawing which illustrates a subterranean, permeable, viscous oil-containing formation 10 penetrated by at least one injection well 12 and at least one spaced-apart production well 14. The injection well 12 and the production well 14 are in fluid communication with a substantial portion of the formation 10 by means of perforations 16 and 18. A downhole steam generator 20 is positioned in the injection well 12, preferably about midway of the vertical thickness of the formation 10. The downhole steam generator 20 comprises any suitable type of combustion zone in which substantially pure oxygen is contacted with a water-soluble fuel dissolved in water thereby effecting spontaneous combustion of the fuel to generate a mixture of steam and combustion gases. A water-soluble fuel from a source 22 is transported via line 24 and commingled with water from source 26 via line 28. The mixture of the water-soluble fuel and water is introduced under pressure into the downhole steam generator 20 via line 30 where it is contacted with substantially pure oxygen under pressure from line 32 thereby effecting spontaneous combustion of the fuel to generate a mixture of steam and combustion gases. The downhole steam generator is operated at pressures within the range of 1000 to 3000 psi and at a temperature within the range of 550° F. to 700° F. The steam generated by the downhole steam generator is wet steam having a quality within the range of 60 to 85%, preferably 80%. The steam and combustion gases exits the downhole steam generator 20 via line 34 and pass into formation 10 by means of perforations 16. The steam passes through the formation 10 reducing the oil's viscosity and displacing the oil toward production well 14 from which fluids including oil are produced. Generation of steam is continued and fluids are produced from production well 14 until the fluids being recovered comprise an unfavorable ratio of oil to water.

Any water-soluble fuel can be employed in the process which in contact with substantially pure oxygen under pressure will spontaneously ignite. Suitable water-soluble fuels include sugars such as molasses and raw sugar beet extract (juice) and alcohols such as methanol, ethanol, propanol, and isopropanol and combinations thereof. Of these, raw sugar beet extract (juice) is particularly preferred for economical reasons. Generally, the concentration of water-soluble fuel will be from about 10 to about 33 weight percent which will depend upon the heating value of the fuel. For raw sugar beet extract (juice) the preferred concentration is about 20 weight percent.

Since the fuel introduced into the downhole steam generator is liquid and not gaseous, no compression is necessary to inject it downhole thereby eliminating the energy required for compression as required if a gaseous fuel were used. In addition, since oxygen and the water-soluble fuel dissolved in water is a well mixed single phase, heat is transfered directly to the water phase in the combustion zone of the downhole steam generator 20 resulting in very high heat transfer efficiency. Also, use of substantially pure oxygen decreases the amount of combustion gases formed by 80% compared to using air. Another advantage of this process is that combustion and steam generation occur in one step in the downhole steam generator 20.

The amount of oxygen introduced into a 10 million BTU/hr downhole steam generator is about 19 tons per day.

In another embodiment of the present invention, the recovery process may be conducted in a single well utilizing a conventional "push-pull" or "huff and puff" steam stimulation cycle. In this embodiment, the downhole steam generator is located in a single well that penetrates the oil-containing formation and is in fluid communication therewith. As previously described, spontaneous combustion of a pressurized mixture of a water-soluble fuel dissolved in water in contact with substantially pure oxygen is effected in a downhole steam generator located in the well adjacent to the oil-containing formation to generate steam and combustion gases. The steam and combustion gases pass through the oil-containing formation so that the oil is heated and reduced in viscosity. Generation of a mixture of steam and combustion gases is continued for a predetermined period of time or until the steam front propagates a predetermined distance of about 5 to 50 feet from the well. Thereafter, steam generation is terminated and the well is put into production wherein fluids including oil are recovered from the well. In addition, after steam generation has been terminated, the well may be shut-in to allow the formation to undergo a soak period which enables the steam in the formation to deliver heat to the in-place viscous oil prior to opening the well to production. The soak period is continued until portions of the viscous oil have received enough heat that the oil will flow more readily through the formation into the well. The steps of generating steam from the downhole steam generator followed by production may be repeated for a plurality of cycles.

In still another embodiment of the present invention, a hydrocarbon fuel-in-water emulsion may be injected into the downhole steam generator for combustion with the substantially pure oxygen instead of the water-soluble fuel. Suitable hydrocarbon fuels include kerosene, gas oil, diesel oil, crude oil, or partially refined tar which is generally known as syncrude. The hydrocarbon fuel-in-water emulsion contains from about 5 to 10 weight percent hydrocarbon fuel. The hydrocarbon fuel is dispersed in the water to form a stable emulsion (a dispersion of hydrocarbon fuel droplets in water). Dispersion of the hydrocarbon fuel and stability of the dispersion might be aided by the addition of small amounts of surfactants or emulsifiers in an amount of about 0.05 to 0.2 weight percent. Preferably, sufficient hydrocarbon fuel is dispersed in the water to convert about 80% of the water to steam under downhole conditions when combusted with substantially pure oxygen. The hydrocarbon fuel must be selected that leaves no ash residue when combusted lest such ash plug the injection well. Furthermore, more than 80% of the water can be vaporized provided the salts contained in solution in the water are not concentrated to an extent by vaporization that they precipitate. Conversely, less water should be vaporized if the water is heavily laden with salts that would precipitate if 80% or more of the water were vaporized. For example, between 5 and 6 pounds of diesel oil must be added to 100 pounds of water to produce 80% steam. About 0.1 pound of an ammonium petroleum sulfonate with an average molecular weight between 420 to 500 (molecular weight range from 230–800) should be added to stabilize the emulsion.

The mixture of water-soluble fuel and water or the hydrocarbon fuel-in-water emulsion contains an effective amount of an anti clay-swelling agent to prevent or at least reduce formation permeability damage by clay swelling, particularly vital in the immediate vicinity of the injection wellbore where the permeability is so important. Suitable anti clay-swelling agents include metal halide salts or diammonium phosphate. The metal halide salts which are suitable include sodium chloride, potassium chloride, magnesium chloride, aluminum chloride, ferric chloride, and calcium chloride. The amount of anti clay-swelling agent added to the water mixed with the water-soluble fuel will vary depending upon the quality of the wet steam generated by the downhole steam generator. For the metal halide salt, the amount added to the water mixed with the water-soluble fuel is that amount sufficient to provide a concentration of at least 0.5 equivalent (0.5 normal) per liter of liquid phase water in the generated wet steam. For example, if the generated wet steam has a quality of 80% which means that 80% of the steam on the basis of weight is vapor with the remaining 20% being liquid phase, then the concentration of metal halide salt in the water added to the water-soluble fuel would be 0.1 equivalents per liter of water or 20% of 0.5. The amount of metal halide salt added to effectively prevent clay-swelling is based upon the results disclosed in U.S. Pat. No. 4,114,693, the disclosure of which is hereby incorporated by reference. For diammonium phosphate, the amount added to the water mixed with the water-soluble fuel is that amount sufficient to provide a concentration of about 33 grams per liter of liquid phase water in the generated wet steam. Adding the anti clay-swelling agent to the fuel/water mixture fed to the downhole steam generator produces a mist containing the clay swelling inhibitor that is propelled into the formation by the generated steam. Clays in the immediate vicinity of the injection well are protected by the clay swelling inhibitor which is essential to maintain injectivity of fluids and although condensing steam dilutes the inhibitor as it moves deeper into the formation some protection against swelling is still offered.

While the invention has been described in terms of a single injection well and a single spaced apart production well, the method according to the invention may be practiced using a variety of well patterns. Any other number of wells, which may be arranged according to any patterns, may be applied in using the present method as illustrated in U.S. Pat. No. 3,927,716 to Burdyn et al, the disclosure of which is hereby incorporated by reference.

Although the present invention has been described with preferred embodiments, it is to be understood that modification and variations may be resorted to, without departing from the spirit and scope of this invention, as those skilled in the art will readily understand. Such variations and modifications are considered to be within the purview and scope of the appended claims.

What is claimed is:

1. In a method of recovering viscous oil from a subterranean, permeable, viscous oil-containing formation, said formation being penetrated by at least one injection well and at least one spaced-apart production well, said wells in fluid communication with a substantial portion of the formation, comprising:
    (a) injecting a stable hydrocarbon fuel-in-water emulsion containing an anti clay-swelling agent under pressure into a downhole steam generator in said injection well;
    (b) injecting substantially pure oxygen into said steam generator under pressure via said injection well which contacts the pressurized hydrocarbon fuel-in-water emulsion containing an anti clay-swelling agent in the steam generator thereby effecting spontaneous combustion of said hydrocarbon fuel to generate a mixture of steam and combustion gases that pass through the formation, displacing oil and reducing the oil's viscosity; and
    (c) recovering fluids including oil from the formation via the production well.

2. The method of claim 1 wherein the steam generated has a quality within the range of 60 to 85%.

3. The method of claim 1 wherein the hydrocarbon fuel is selected from the group consisting of kerosene, gas oil, diesel oil, crude oil and partially refined tar which is generally known as syncrude.

4. The method of claim 1 wherein the hydrocarbon fuel-in-water emulsion contains from about 5 to 10 weight percent hydrocarbon fuel, about 90 to 95 weight percent water and from about 0.05 to 0.2 weight percent emulsifier.

5. The method of claim 4 wherein the emulsifier is an ammonium petroleum sulfonate.

6. The method of claim 1 wherein the pressure in the steam generator is maintained within the range of 1000 to 3000 psi and the temperature is within the range of 550° F. to 700° F.

7. The method of claim 1 wherein the steam generator is located about midway the vertical distance of the oil-containing formation.

8. The method of claim 1 further including continuing step (c) until the fluids produced contain an unfavorable ratio of oil to water.

9. The method of claim 1 wherein the anti clay-swelling agent is selected from the group consisting of metal halide salts, and diammonium phosphate.

10. The method of claim 9 wherein the metal halide salt is selected from the group consisting of sodium chloride, potassium chloride, magnesium chloride, aluminum chloride, ferric chloride, and calcium chloride.

11. The method of claim 9 wherein the concentration of metal halide salt in the water mixed with the water-soluble fuel is an amount sufficient to provide a concentration of 0.5 equivalents of salt per liter of liquid phase water in the generated steam.

12. The method of claim 9 wherein the concentration of diammonium phosphate in the water mixed with the water-soluble fuel is an amount sufficient to provide a concentration of about 33 grams of diammonium phosphate per liter of liquid phase water in the generated steam.

13. In a method for recovering viscous oil from a subterranean, permeable, viscous oil-containing formation, said formation being penetrated by at least one well, said well in fluid communication with a substantial portion of the formation, comprising:
    (a) injecting a stable hydrocarbon fuel-in-water emulsion containing an anti clay-swelling agent under pressure into a downhole steam generator in said injection well;
    (b) injecting substantially pure oxygen into said steam generator under pressure via said injection well which contacts the pressurized hydrocarbon fuel-in-water emulsion containing an anti clay-swelling agent in the steam generator thereby effecting spontaneous combustion of said hydrocarbon fuel to generate a mixture of steam and combustion gases that pass through the formation, displacing oil and reducing the oil's viscosity; and
    (c) continuing injecting said pressurized mixture of hydrocarbon fuel-in-water emulsion and substantially pure oxygen for a predetermined period of time; and
    (d) thereafter, discontinuing fluid injection of step (d) and opening said well to production so that fluids including oil are recovered from the formation.

14. The method of claim 13 wherein the steam generated has a quality within the range of 60 to 85%.

15. The method of claim 13 including repeating steps (a) through (d) for a plurality of cycles.

16. The method of claim 13 comprising the additional step of leaving the steam and hot combustion gases injected into the formation in step (b) in the formation for a soak period for a predetermined time interval prior to the fluid production in step (d).

17. The method of claim 13 wherein the pressure in the steam generator is maintained within the range of 1000 to 3000 psi and the temperature is within the range of 550° F. to 700° F.

18. The method of claim 13 wherein the steam generator is located about midway the vertical distance of the oil-containing formation.

19. The method of claim 13 wherein the hydrocarbon fuel is selected from the group consisting of kerosene, gas oil, crude oil and partially refined tar which is generally known as syncrude.

20. The method of claim 13 wherein the hydrocarbon fuel-in-water emulsion contains from about 5 to 10 weight percent hydrocarbon fuel, 90 to 95 weight percent water, and about 0.05 to 0.2 weight percent emulsifier.

21. The method of claim 20 wherein the emulsifier is an ammonium petroleum sulfonate.

22. The method of claim 13 wherein the anti clay-swelling agent is selected from the group consisting of metal halide salts, and diammonium phosphate.

23. The method of claim 22 wherein the metal halide salt is selected from the group consisting of sodium chloride, potassium chloride, magnesium chloride, aluminum chloride, ferric chloride, and calcium chloride.

24. The method of claim 22 wherein the concentration of metal halide salt in the water mixed with the water-soluble fuel is an amount sufficient to provide a concentration of 0.5 equivalents of salt per liter of liquid phase water in the generated steam.

25. The method of claim 22 wherein the concentration of diammonium phosphate in the water mixed with the water-soluble fuel is an amount sufficient to provide a concentration of about 33 grams of diammonium phosphate per liter of liquid phase water in the generated steam.

* * * * *